United States Patent [19]

Staats, Jr.

[11] 4,383,240

[45] May 10, 1983

[54] RECORDER OF THE STATUS OF A TRAFFIC CONTROL SYSTEM

[75] Inventor: Charles W. Staats, Jr., Mesa, Ariz.

[73] Assignee: Solid State Devices, Tempe, Ariz.

[21] Appl. No.: 237,590

[22] Filed: Feb. 24, 1981

[51] Int. Cl.³ .................................................. B60Q 9/00

[52] U.S. Cl. ...................................... 340/46; 315/132; 340/642

[58] Field of Search ................. 340/46, 41 R, 37, 635, 340/642; 315/132

[56] References Cited

U.S. PATENT DOCUMENTS

| | | | |
|---|---|---|---|
| 3,629,802 | 12/1971 | Clark et al. | 340/46 |
| 3,778,762 | 12/1973 | Jarko et al. | 340/46 |
| 4,135,145 | 1/1979 | Eberle | 340/46 |
| 4,307,392 | 12/1981 | Loshbough et al. | 340/642 |

*Primary Examiner*—Glen R. Swann, III

*Attorney, Agent, or Firm*—Harry M. Weiss

[57] ABSTRACT

A recorder of the states of a traffic control system which stores and visually displays the current operational state of the system. The current states of the command signals produced by the traffic controller of the system and the current states of energization of each traffic signal light, after a predetermined delay, are stored in a bistable device. The occurrence of an error, conflicting or improper timing of the energization of the traffic lights of the system or of the command signals controlling the energization of such lights are sensed by a conflict monitor. Upon the occurrence of an error, the bistable devices are latched, i.e. prevented from thereafter changing state. The state of each bistable device is visually displayed as of the occurrence of an error.

30 Claims, 4 Drawing Figures

RECORDER OF THE STATUS OF A TRAFFIC CONTROL SYSTEM

BACKGROUND OF THE INVENTION

1. Field of the Invention

This invention is in the field of traffic control systems in which command signals from a traffic controller are applied to load switches to control the energization of traffic signal lights to regulate the flow of traffic. More particularly, this invention relates to a recorder of key operational information of the traffic control system which visually displays this operational data. Included in the key operational information recorded is the state of the command signals and of the energization of the traffic signal lights when an error in the operation of the systems is detected, which information is an aid identifying the sources, or causes of errors and, thus, in correcting them.

2. Description of the Prior Art

The use of traffic signal lights to control the flow of traffic, particularly at the intersection of two or more streets or highways, is well known. The traffic signal lights controlling traffic at one intersection are typically controlled by a local traffic controller which is programmed to produce command signals which are applied to load switches. The load switches in turn energize and deenergize, or turn on and turn off, traffic signal lights of the system. Typically, one load switch controls one or more traffic lights which are connected in parallel with a source of electrical power, normally AC. The lights controlling a flow of traffic on one street (single phase traffic) are grouped together physically and logically. As a typical minimum, such a group of lights would consist of a single traffic signal head with one red, one yellow, and one green signal light for controlling traffic coming from a single direction, and would most likely include a second red, yellow and green signal lights coupled in parallel with the first red, yellow and green signal lights for controlling traffic coming from an opposite direction. Obviously, other types of lights for controlling left turns, right turns, pedestrian traffic, etc. can also be included, and if they are, there would be a separate load switch for each such type. In the typical minimum configuration, one load switch would be associated with each of the red, yellow and green lights of a single traffic head, and the load switches for one signal head would constitute a group, or block, of such switches.

The relevant prior art has been primarily concerned with detecting malfunctions of the traffic controllers of such systems examples of which would be issuing conflicting command signals, and in the energizing of traffic signal lights such as energizing a traffic signal light in the absence of a command signal from the controller.

In addition, U.S. Pat. No. 4,135,145 which issued on Jan. 16, 1979 and is entitled "Error Detecting Circuit For A Traffic Control System", teaches an error detection circuit for a traffic control system that is electrically connected to traffic signal light energizing circuits for turning on and off the traffic signal lights controlling the flow of a single phase of traffic. The error detector circuit of this invention senses the operating states of the traffic signal lights controlled by a single block of load switches and produces an error signal if certain relationships between the energization status of such lights exists for more than a predetermined period of time. The error signal, when produced, is applied to a latch circuit which in turn causes a visual indicator to be energized and remain energized. The visual indicator identifies to a serviceman the group of traffic signal lights and their associated block of load switches which were the source of the error. As the complexity of the traffic control systems increases, which result in the number of load switches and signal lights to be controlled by such load switches increases, there is a need for better diagnostic tools to aid a serviceman in identifying the cause of errors detected by the system's fault detectors so that the system can be restored to its normal operating mode as quickly as possible.

SUMMARY OF THE INVENTION

The present invention provides a recorder which records and displays the operating states of key signals of a traffic control system at the time a fault, or error, in the operation of the system is detected. The traffic control system has a plurality of traffic signal lights arranged in a plurality of traffic signal heads which are used to control vehicular and pedestrian traffic. The energization of traffic lights is controlled by load switches with a block of such switches controlling one or more traffic signal heads. The traffic lights that are energized at any given time are energized in response to command signals produced by the traffic controller of the system. A fault monitor, or detector, senses the state of energization of each traffic signal light of the system, for example, and if an error, or fault, condition is sensed, terminates the energization of traffic signal lights through the load switches. The recorder senses the state of energization of each of the traffic signal lights and of the command signals and produces logic signals representative of their states. These logic signals, after a predetermined delay are applied to bistable storage devices which assume a state corresponding to the logic signals applied to them. The state of each storage devices is visually displayed. The fault monitor in response to its sensing a fault condition, inhibits, or prevents, the storage devices from thereafter changing state if the values of the logic signals applied to such storage devices change, subsequent to an error being detected. Thus, the state of the command signals and the state of energization of each of the traffic signal lights of the system is stored as of the time the fault was detected and is displayed thereafter unchanged as long as the fault detector of the system continues to produce a fault detected signal. Such operational data, or information of the operational status of the system as of the time a fault or error is detected is of great value to a serviceman in identifying the cause of the fault, or error, which is the first step in restoring the system to normal operation with a minimum of delay.

BRIEF DESCRIPTION OF THE DRAWINGS

Other objects, features and advantages of the invention will be readily apparent from the following description of certain preferred embodiments thereof, taken in conjunction with the accompanying drawings, although variations in modifications may be affected without departing from the spirit and scope of the novel disclosure and in which.

DETAILED DESCRIPTION OF THE INVENTION

Figure 1A:
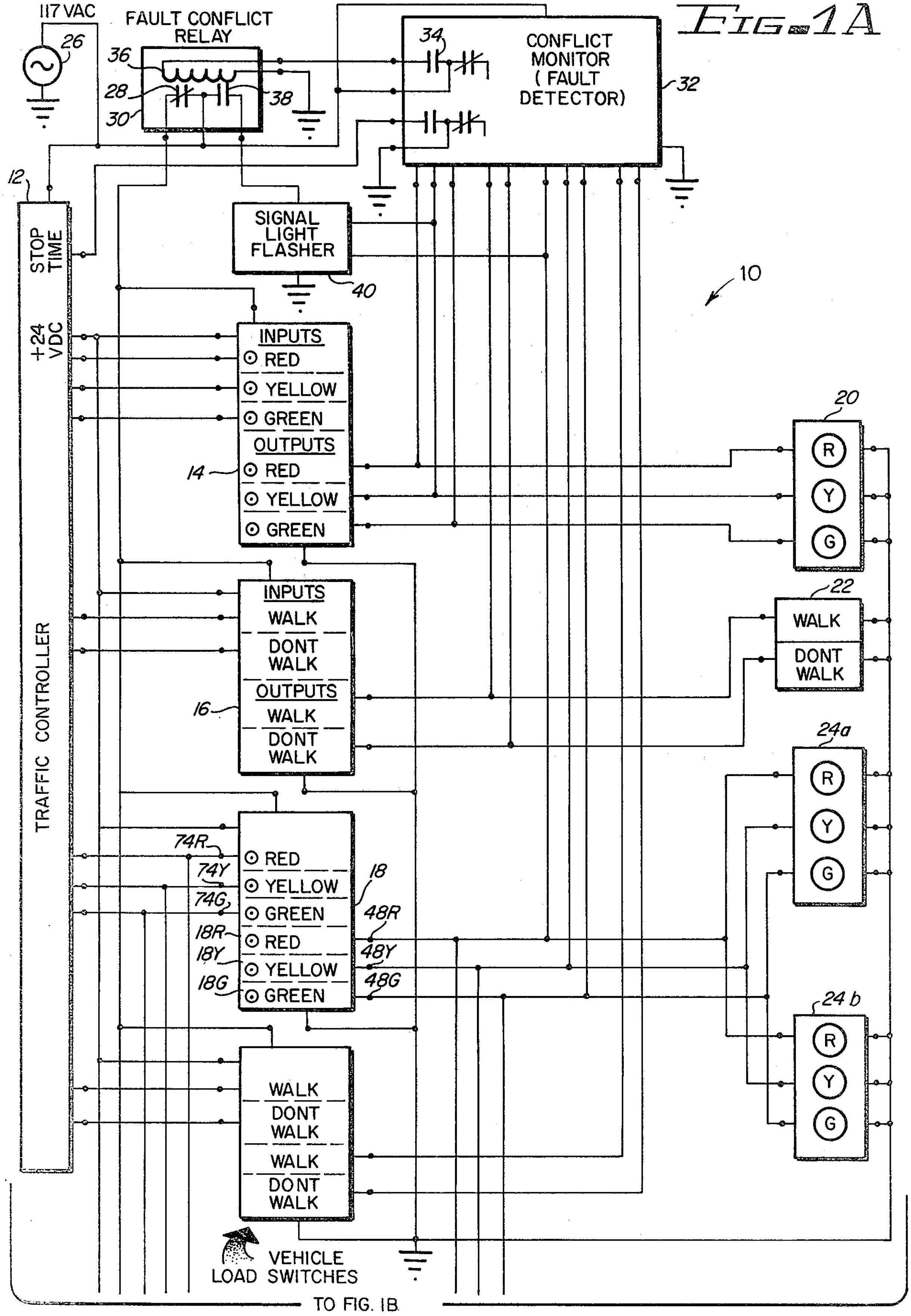
FIGS. 1A and 1B are a block diagram of a traffic control system illustrating the relationship between the subsystems of the control system and the monitor and display circuit of the present invention.
Figure 1B:
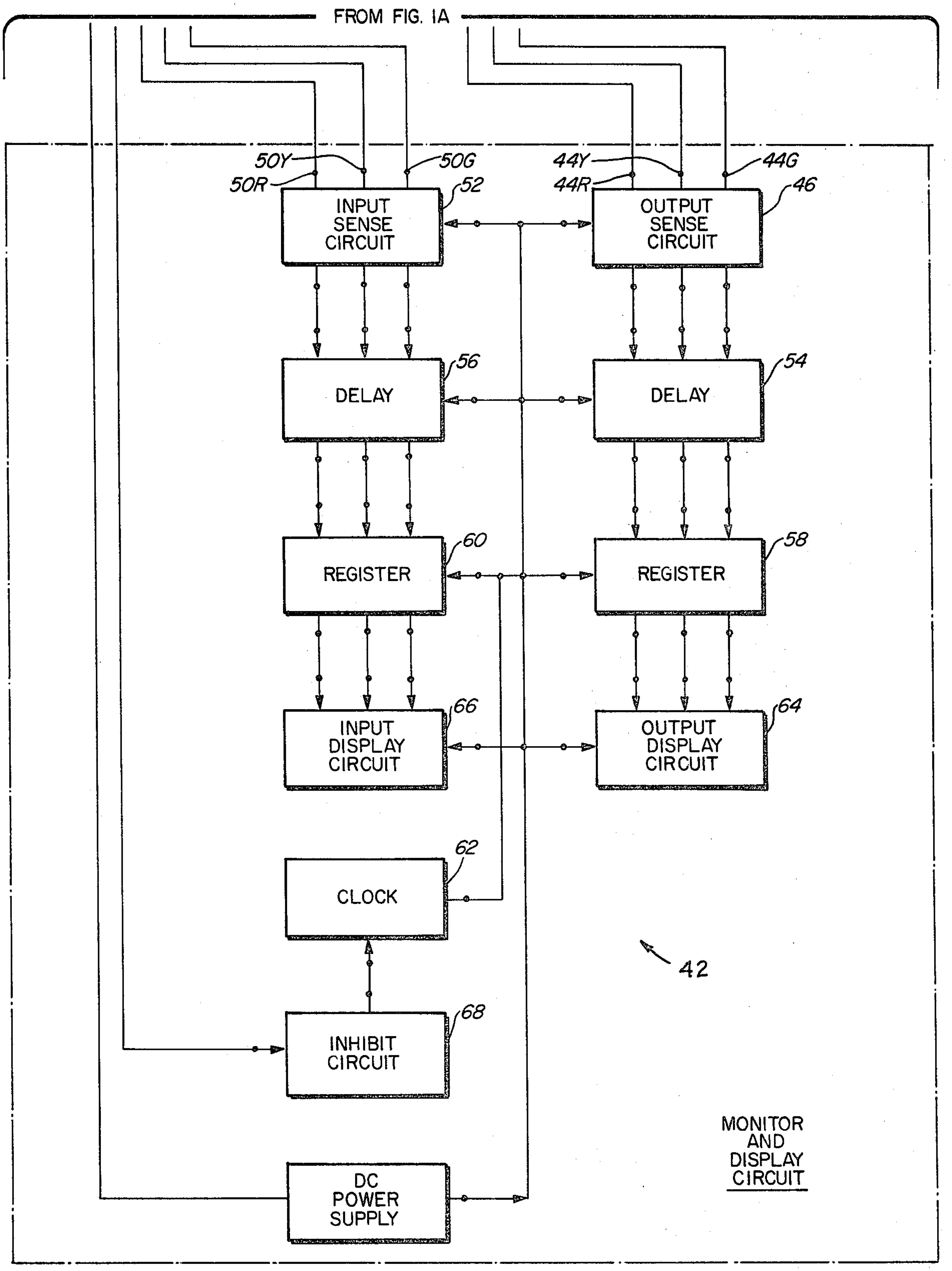

In FIG. 1, traffic control system 10 is provided with a traffic controller 12 which is the source of command, or control, signals which through a plurality of groups, or blocks, of load switches 14, 16, 18 operate, or control, all the traffic signal heads, or arrays, **20, 22, 24*a*, 24*b*. Signal heads 20, 24*a* and 24*b* which control vehicular traffic, each has a red traffic signal light R, a yellow traffic signal light Y, and a green traffic signal G. Signal head 22 which controls pedestrian traffic has "WALK" and "DON'T WALK" displays or signal lights which are so marked. In FIG. 1, the array of signal lights controlled by block of load switches 14, is illustrated as being comprised of a single traffic head 20 as is the array of signal lights 22 for pedestrian traffic which is controlled by block of load switches 16. Block of load switches 18 is illustrated as controlling two arrays 24*a* and 24*b*** of traffic signal lights. In practice, more than one array of traffic signal lights can be controlled by one block of load switches; in fact, all the lights used to control the flow of a single phase of traffic can be controlled by one group, or block, of load switches.

Traffic control system 10 is illustrative of a relatively simple control system to facilitate its description. A system for controlling the flow of vehicular and pedestrian traffic at a complex intersection would have many more blocks of load switches and traffic signal heads then are illustrated in FIG. 1.

Each block of load switches 14, 16 and 18 is comprised of a load switch for each type of traffic signal light or light having the same function, i.e. all of the red signal lights of the arrays of signal lights **24*a*, 24*b* are controlled by load switch 18R, the yellow by load switch 18Y and the green by load switch 18G. The red signal lights of traffic signal head 24*a*, 24*b*, are connected in parallel through load switch 18R to an electrical power supply 26 through the normally closed contacts 28 of fault relay 30. Power supply 26 is usually at a voltage and frequency which is supplied by an electric utility normally 60 cycle AC at 117 volts. The state of each of the load switches 18R, 18Y and 18G, for example, either open or closed is controlled by a command signal applied to it by traffic controller 12 as is the state of each load switch of each block of load switches 14 and 16. In the embodiment illustrated, command signals produced by controller 12** are logic low signals in relationship to the 24 volt DC supply signal.

Fault detector 32 is operationally, or electrically, connected to each of the circuits between a load switch of each block of load switches 14, 16 and 18 of system 10 and the traffic signal lights of each of such load switches energizes. AC power from power supply 26 flows through an energization circuit to energize or turn on a given traffic signal light. The energization circuit of traffic signal light 20R includes power supply 26, power from which flows through the normally closed contacts 28 of fault relay 30, through load switch 14R of the block of load switches 14 and through traffic signal light 20R to ground. In normal operation the opening of switch 14R deenergizes the traffic control light 20R, or turns it off, and closing switch 14R energizes traffic control light 20R, or turns it on.

Fault detector 32, which is a conventional and commercially available circuit, is operationally, or electrically connected to the energization circuit through which each load switch of the blocks of load switches 14, 16, 18 illustrated energize or deenergize, turn on or turn off, traffic signal lights connected to or energized by that energization circuit. Fault detector 32 thus, senses the state of energization of each traffic signal light of system 10. When an error in the operation of system 10 is detected by fault monitor 32, such as improper timing which produces unintended overlaps, or conflicts, of the energization of the traffic lights of the system, or an improper energization state of any of such lights, fault monitor 32 causes normally open contacts 34 to close which energizes coil 36 of fault relay 30 which in turn opens contacts 28 and closes contacts 38. Opening contacts 28 opens all traffic energization circuits through the load switches of the blocks of load switches 14, 16, 18. The simultaneous closing of contacts 38 energizes traffic signal light flasher 40 which periodically energizes and deenergizes selected yellow and red traffic signal lights such as 20Y and **24*a*R and 24*b*R to alert vehicular and pedestrian traffic controlled by system 10** that the system is not operating in its usual or normal mode.

Monitor and display circuit 42 monitors the state of energization of each of the traffic signal lights controlled by a given load switch and the state of each command signal produced by controller 12 each of which command signals controls a load switch. To do this, the input terminals 44R, 44Y and 44G of signal light energization sense circuit, or output sense circuit, 46 of monitor circuit 42 are connected to output terminals 48R, 48Y and 48G of load switches 18R, 18Y and 18G and input terminals 50R, 50Y and 50G of command signal sense circuit, or input sense circuit 52 of monitor circuit 42 are connected to the input terminals 74R, 74Y and 74G of load switches 18R, 18Y and 18G. To simplify the disclosure, sensing circuits 46 and 52 are illustrated as being connected to the input and output terminals of only one block of load switches, i.e. block 18. It should be understood that additional sensing circuits similar to circuits 46 and 52 could be connected to all the input and all the output terminals of all the blocks of load switches of system 10. Sensing circuit 46, 52 produce, as their outputs, logic signals, with a logic signal being produced for each signal applied to sense circuits 46 and 52. The value of each logic signal corresponds to the status of each command signal and of the energization status of each traffic signal light connected to, or monitored by monitor and display circuit 42. The logic signals produced by sense circuits 46, 52 are applied to delay circuits 54, 56 which delays each of them for a predetermined period of time. The delayed logic signals are then applied to conventional registers 58, 60.

It takes a small but finite period of time for fault detector circuit 32 to sense an error, or fault, condition to energize relay 30, to open contacts 28 and to turn off the traffic signal lights of signal heads **20, 22, 24*a* and 24*b* by deenergizing their energization circuits through, or which include, the load switches of blocks of load switches 14, 16 and 18. Since this period of time is finite, it is possible during this time interval, for the command signals or the energization signals applied to the sense circuits 46, 52 of monitor and display circuit 42** to change. Since the purpose of monitor and display circuit 42 is to store and display the status of the command signals and the state energization of traffic signal lights at the time an error is detected, it is necessary to provide a delay, the function of delay circuits 54, 56, which equals or exceeds that taken for the conflict monitor 32 to respond to an error and to produce a fault detected signal by energizing coil 36 of which is then utilized to inhibit or prevent any further changes in the states of the flipflops of registers 58, 60.

Each register 58, 60 is provided with or includes a bistable storage device, or flipflop, one for each logic signal applied to register circuits 58, 60 by delay circuits 54, 56. Each flipflop of registers 58, 60 in the preferred embodiment is a D-type which will assume one or the other of its two stable states depending upon the value of the logic signal applied to each flipflop at the time a clock pulse which is applied to register 58, 60 by clock 62 goes positive. Thus, the flipflops of each register 58, 60 will assume the state of the logic signal applied at the time a clock pulse which is applied to register 58, 60 goes positive to store that signal. Visual indicator or display circuits 64, 66 visually display the state of each of the flipflops or storage elements of registers 58, 60.

Inhibit circuit 68 is connected to the source of electric power 26 through normally closed contacts 28 of fault relay 30. Upon fault detector circuit 32 sensing or detecting an error in the operation of system 10, fault detector circuit 32 causes relay 30 to open contacts 28 so that AC power is no longer applied to inhibit circuit 68; i.e., fault detector 32 produces a fault detected signal, which terminates the application of AC power to inhibit circuit 68. With AC power absent, inhibit circuit 68 functions to inhibit, or prevent, the flipflops of register 58 and 60 from changing state, or latches them in the state they were in, when an error was detected by a fault detector 32. As long as no AC power is supplied to inhibit circuit 68 (i.e., as long as fault monitor 32 produces a fault detected signal so that relay 30 removes AC power from inhibit circuit 68), inhibit circuit 68 prevents the storage elements of registers 58, 60 from changing state. Thus, display circuits 64 and 66 will display the states of the command signals produced by traffic controller 12 and the states of energization of the traffic signal lights controlled by each of the load switches of the blocks of load switches 14, 16, 18, the operational status of system 10, at the time an error is detected by fault detector circuit 32.

Figure 2:
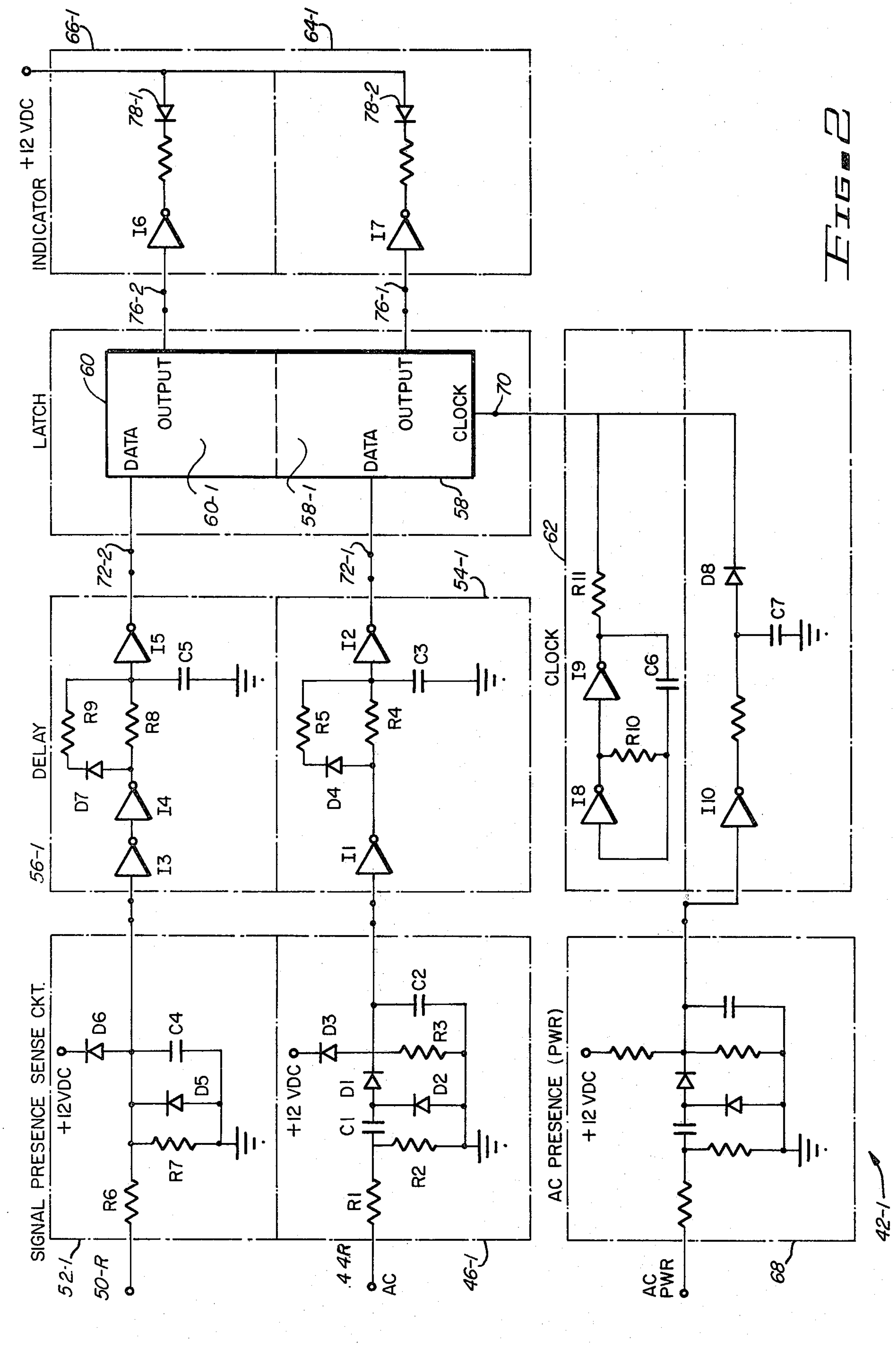
FIG. 2 is a schematic diagram of a preferred embodiment of the monitor and display circuit.

FIG. 2 is a schematic circuit diagram of the preferred embodiment of monitor and display circuit 42-1. An AC signal is applied to input terminal 44R of sense circuit 46-1 when load switch 18R is closed to connect its output terminal 48R to AC power supply 26. The applied voltage, if present, is sensed by a voltage divider comprised of resistors R1 and R2. The voltage across R2 is capacitively coupled by capacitor C1 to diode D1. Diode D1, resistor R3, and capacitor c2 rectify and filter the applied AC signal to convert the AC input to a DC logic signal at the output terminal of sense circuit 46-1. Diode D2 and D3 clip the applied AC signals so that the logic signal at the output terminal of circuit 46-1 is limited to voltages substantially between ground and a maximum of 12 volts in this embodiment. The DC logic signal produced by the output sense circuit 46-1 is applied to delay circuit 54-1. Delay circuit 54-1 in response to a logic high, or 1, which occurs when AC current is present at terminal 44R is inverted by inverter I-1 of delay circuit 54-1 which also includes resistors R4, R5, diode D4 and capacitor C3. The amount of the delay is determined by the time constant of the circuit as is well known in the electronics art. The delayed signal across capacitor C3 is inverted by inverter I-2 to provide a non-inverted signal output at the output terminal of delay circuit 54-1. This signal is applied to one of the input terminals of a conventional large scale integrated circuit, a D latch circuit, one or more of which comprise registers 58, 60. The output signal of delay circuit 54-1 is then applied to the input terminal 72-1 of flipflop 58-1 of latch 58 and at the time a clock signal produced by relaxation oscillator 62 which is applied to clock terminal 70 goes positive, flipflop 58-1 will assume a state corresponding value of the logic signal applied to its input terminal 72-1.

The input signal to input terminal 50R of input sense circuit 52-1 is a DC voltage having a value substantially of either 0 or +24 volts in the preferred embodiment. The signal or voltage is applied across a voltage divider circuit consisting of resistors R6 and R7. The voltage across R7 is filtered by capacitor C4 so that the output signal of a sense circuit 52-1 is a logic signal which is a low or a logic 0 if a command signal is present or applied to input terminal 50R and is a high or a logic 1; if there is no command signal present at input terminal 74R of load switch 18R and input terminal 50R, for example. Sensing circuit 52-1 is provided with diode D5 and D6 which essentially clip, or limit, the maximum and minimum values of the logic signal produced at the output terminal of sense circuit 52-1 so that the minimum value is essentially ground and the maximum value is +12 volts DC. The output signal of sensing circuit 52-1 is applied to delay circuit 56-1. Inverters I-3 and I-4 invert the logic signals produced by sensing circuit 50-1 twice so that a non-inverted signal is applied to resistor R8 capacitor C5, diode D7 and resistor D9. Inverter I-5 inverts the output so that the output signal of delay circuit 56-1 is inverted from that applied. The inverted output signal of delay circuit 56-1 is applied to input terminal 72-2 of a flipflop 60-1 of register 60 which flipflop 60-1 will assume the value of the signal applied to its input terminal 72-2 when the clock pulse present at the clock terminal 70 of D latch circuit 60 goes positive.

The output terminals 76-1, 76-2 of the flipflops or storage elements 58-1, 60-1 of registers 58, 60 are connected to display circuits 64-1, 66-1. The output signal of the flipflop of register 60-1 at its output terminal 76-2 is inverted by inverter I-6 so that when the output signal at terminal 76-2 is high, or a logical one, light emitting diode, or LED, 78-1 will be energized to produce light. Similarly, output terminal 76-1 of flipflop 58-1 of register 58 is inverted by inverter I-7 so that when the output at terminal 76-1 of flipflop 58-1 is high, LED 78-2 will have current flowing through it so that it produces light.

Clock 62 is a conventional free-running relaxation oscillator which is comprised of inverters I-8 and I-9 which are provided with feedback circuits which includes resistor R10 and capacitor C6. The output signals, or clock pulses, of clock 62 are applied through resistor R11 to the clock input terminal 70 of conventional latch circuits 58, 60.

Inhibit circuit 68 has applied to it AC power which is controlled by contacts 28 of fault relay 30. Circuit 68 reduces the amplitude of the AC power, rectifies it and produces a DC signal a logic signal 0, or 1 which is applied to the inverter I-10. As long as an AC signal is present, a positive signal will be applied to inverter I-10 and the output of inverter 10 will be substantially ground. No voltage will build up across capacitor C7 and diode D8 will be back biased to provide a high impedance to the clock pulses produced by clock circuit 62. At such time error condition in system 10 is sensed by fault detector 32 and a fault detected signal is produced which results in AC power no longer being applied to the input terminal of inhibit circuit 68, the voltage applied to inverter I-10 will go essentially to ground and the output of inverter I-10 will be high, plus 12 volts DC, which will bias forward the diode D8 and clamp the clock input terminal 70 of registers 58, 60 to +12 volts DC. This voltage prevents all the flipflops of resistors 58, 60 from changing state, i.e. the clock signal is latched high, until such time as the error detected signal is no longer produced by fault detector circuit 32, or AC power is applied to the input terminal of inhibit circuit 68.

The function of sensing circuits 52-1 and 46-1 is to convert the applied AC or DC signals to logic signals compatible with the delay and register circuits to monitor and display circuit 42. The difference between sensing circuits 52-1 and 46-1 is the result of the differences between types of signals applied such as 117 AC to sensing circuit 46-1 and 24 v DC to sensing circit 52-1. If the input signals were the same, circuits 50-1 and 46-1 would be substantially the same.

Figure 3:
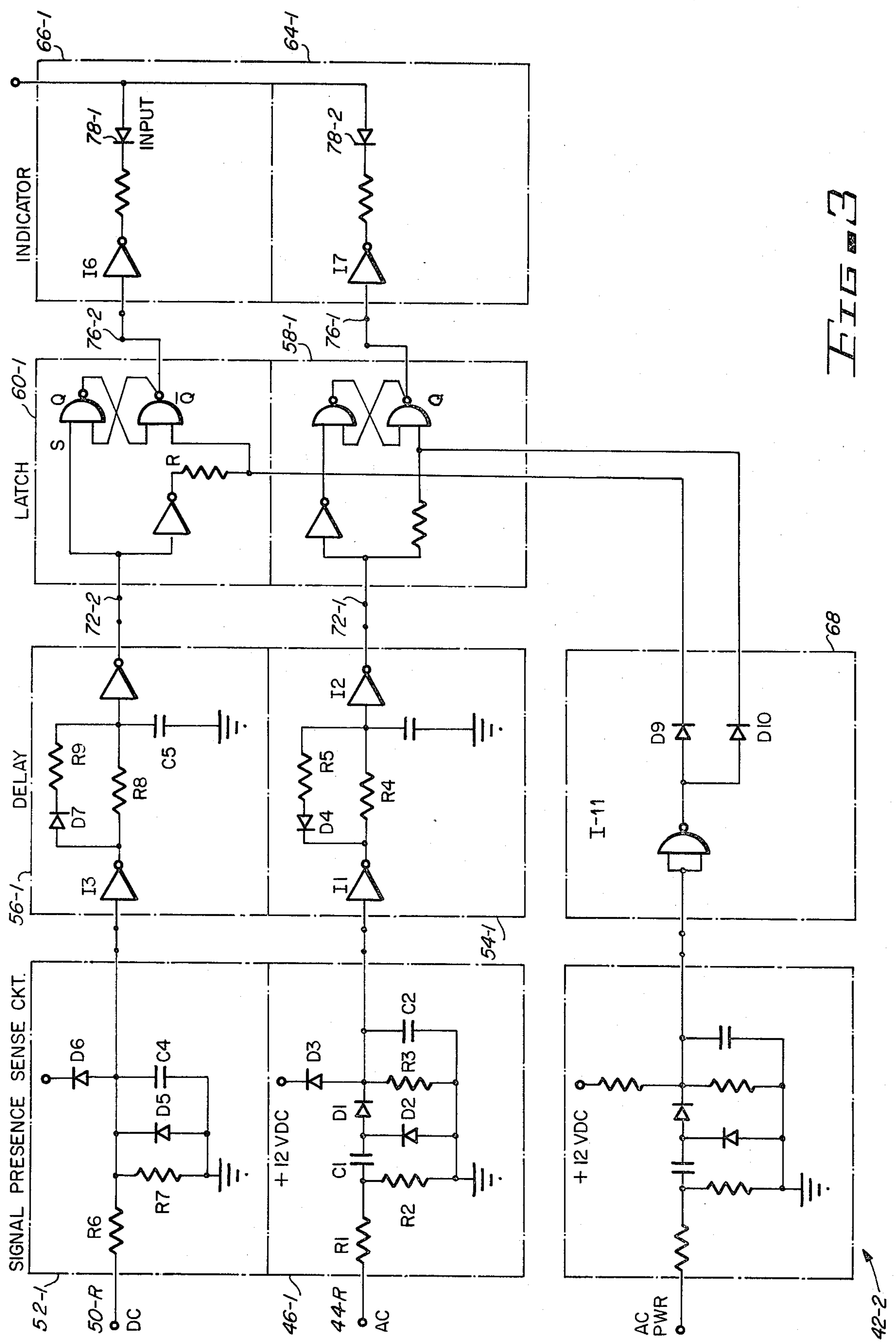
FIG. 3 is a schematic diagram of a second embodiment of the monitor and display circuit of this invention.

In the embodiment illustrated in FIG. 3, the only difference in the details of the monitor and display circuit 42-2 illustrated in FIG. 3 is that details of the register circuits 60-1, 58-1 are illustrated, i.e. as being comprised of cross-coupled dual input NAND gates which do not use a clock pulse to enable a change of state of the flipflops of the registers 58 and 60. Inhibit circuit 68 is essentially the same as that illustrated in FIG. 2 except that the inverter I-11 is illustrated as being a dual input NAND gate which is connected through diodes D-9 and D-10 to the reset, R, terminals of flipflops 58-1, 60-1 of registers 58 and 60. Flipflops 58-1, 60-1 will assume the state of the logic signals applied to their input terminals 72-1, 72-2. When AC power is no longer applied to inhibit circuit 68, the reset terminals R of the flipflops 58-1, 60-1 will be clamped to +12 DC volts which will prevent them from clamping state as long as this condition exists. Thus, the status of the command signals and of the energization of the traffic signal lights as of the time that a fault or error was detected by fault detector circuit 32 will be stored in the flipflops 58-1, 60-1 of registers 58 and 60 and will be displayed visually by the display circuits 64-1, 66-1 so that a serviceman can quickly tell by observing display circuits 64, 66 the operational state, or status, of traffic control system 10 at the time an error was detected by fault detector 32. Such information is obviously of great assistance in identifying the cause or causes of the problem, or problems, and facilitates promptly correcting them in the minimum period of time.

From the foregoing it is believed obvious that the monitor and display circuit comprising this invention provides significant information of invaluable assistance in identifying the source of errors which cause a traffic control system to terminate its normal mode of operation and to enter its error, or standby, mode.

It should be evident that various modifications can be made to the described embodiment without departing from the scope of the present invention.

What is claimed is:

1. A recorder of the operating state of a traffic control system wherein a plurality of traffic signal lights are selectively energized in response to command signals comprising, in combination:

first means for monitoring the state of the signal lights and of said command signals, for storing said states, and for displaying the state of the signal lights and command signals so stored; and second means for maintaining said display unchanged upon the occurrence of predetermined states of the system.

2. A recorder as defined in claim 1 in which stored states of the signal lights and command signals are visually displayed.

3. A recorder as defined in claim 2 in which the predetermined states of the system are faults.

4. A recorder of the operating state of a traffic control system wherein a plurality of traffic signal lights are selectively energized in response to command signals, comprising, in combination:

first means for monitoring the state of the signal lights and of the command signals and for displaying the state of such signal lights and command signals; and second means for maintaining said display unchanged upon the occurrence of predetermined states of said system.

5. A recorder as defined in claim 4 in which the first means monitors the state of each of said plurality of signal lights and of each of the command signals.

6. A recorder as defined in claim 4 in which the display is an optical display.

7. A recorder as defined in claim 4 in which the predetermined states are malfunctions of the system.

8. A recorder of the operating state of a traffic control system wherein a plurality of traffic signal lights are selectively energized in response to command signals comprising, in combination:

first means for monitoring the state of each of said plurality of signal lights and of each of said command signals, for storing said states after a predetermined delay, and for displaying the state of each signal light and of each command signal after it has been stored; and second means for sensing the occurrence of a malfunction of said system and for inhibiting any change in said stored states subsequent to the occurrence of a malfunction.

9. A recorder as defined in claim 8 in which the first means include register means for storing said states.

10. A recorder as defined in claim 9 in which said predetermined delay equals or exceeds the delay between the time the second means senses a malfunction and inhibits any change of said stored status.

11. A recorder as defined in claim 10 in which the display is an optical display.

12. A recorder as defined in claim 11 in which the display is produced by light emitting diodes.

13. A recorder of the operating state of a traffic control system upon the occurrence of a predetermined error condition, said traffic control system having a plurality of traffic signal lights which are selectively energized in response to command signals, each of said traffic signal lights and said command signals having two states, comprising:

monitoring means for sensing the state of energization of each signal light and the state of each command signal and for producing a logic signal representative of the state of each;

register means, having two states, for assuming a state corresponding to that of a logic signal applied;

delay means for delaying a logic signal produced by said monitoring means and for applying said delayed logic signal to said register means;

indicator means for displaying the state of said register means;

fault means for sensing a predetermined error condition of said system and for producing a fault detected signal in response thereto;

inhibit means responsive to fault detected signal for inhibiting the register means from changing state as long as a fault detected signal is produced by said fault means.

14. A recorder as defined in claim 13 in which there is a monitoring means, a register means, a delay means, and an indicator means for each command signal and for the traffic signal lights selectively energized in response to each command signal.

15. A recorder as claimed in claim 14 in which the register means is edge triggered to change state by clock pulses which are applied to a clock terminal of said register means by a clock pulse generator of said recorder.

16. A recorder as defined in claim 15 in which the indicator means includes means for producing visible light.

17. A recorder as defined in claim 16 in which the inhibit means clamps the clock terminal to a predetermined voltage to inhibit the register means from changing state.

18. A recorder of the operating state of a traffic control system having a plurality of traffic signal lights which are selectively energized by energization circuits in response to command signals comprising in combination: monitoring means for monitoring the state of energization of each energization circuit and the state of each command signal and for producing a logic signal representative of each of said states; a plurality of storage means, each having two states corresponding to that of a logic signal applied, the state of each storage means being determined by the logic signal applied thereto, said plurality of storage means being operationally connected to the monitoring means, each said storage means assuming a stable state corresponding to the logic signal applied to it by said monitoring means, said plurality of storage means thereby storing the state of each monitored command signal and the state of the corresponding energization circuit; display means operationally connected to each of said storage means for displaying the stable state of each storage means; and inhibit means operationally connected to the storage means for inhibiting said storage means from thereafter changing state upon the occurrence of a predetermined fault condition of said system.

19. A recorder as defined in claim 18 in which the means for operationally connecting the monitoring means and storage means includes means for delaying the application of a logic signal to a storage means for a predetermined period of time.

20. A recorder as defined in claim 19 in which the predetermined period of time is equal to or greater than the time for the inhibit means to inhibit the storage means from changing state after the occurrence of a fault condition.

21. A recorder as defined in claim 18 in which the storage means is a plurality of registers.

22. A recorder as defined in claim 21 in which the registers change state only when a predetermined edge of a clock pulse is applied to a clock input terminal of said storage means from a clock pulse oscillator of the recorder.

23. A recorder as defined in claim 22 in which the display means is visually observable.

24. A recorder as defined in claim 23 in which the display means includes a light emitting diode for displaying the stable states of each storage means.

25. A traffic control system comprising:

a traffic controller for producing command signals;

a plurality of load switches connected to and controlled by command signals from the traffic controller;

a plurality of traffic signal lights adapted to be energized from a source of electrical power by energization circuits each of which includes a load switch;

fault monitoring means for monitoring the state of each of said plurality of signal lights, for deenergizing the energization circuits and for periodically energizing selected one of said signal lights upon the occurrence of a fault;

monitor and display means operationally connected to the traffic controller and to the energization circuit of each traffic light for sensing the state of each of the energization circuits of the traffic signal lights and of each of said command signals, for storing the said states and for displaying the state of each energization circuit and each command signal so stored; and inhibit means operationally connected to the energization circuit and responsive to the deenergization of said energization circuit by the fault monitoring means for presenting said display from changing upon the occurrence of a fault sensed by the fault monitor means.

26. A traffic control system as defined in claim 25 in which the monitor and display means delays storing said states for a predetermined period of time.

27. A traffic control system as defined in claim 26 in which said predetermined period of time is such that no change in said stored states occurs between the occurrence of a fault sensed by the fault monitor means and the inhibit means preventing said display from changing.

28. A traffic control system as defined in claim 25 in which the monitor and display means visually display the state of energization circuit and each command signal.

29. A traffic control system as defined in claim 28 in which in the visual display is produced by light emitting diodes.

30. A traffic control system as defined in claim 29 in which the fault monitoring means includes a fault detector, a fault relay and a signal light flasher.

* * * * *